3,205,255
PREPARATION OF DIMETHOXYBORANE
Lawrence J. Edwards, Zelienople, Pa., and Richard K. Pearson, Pleasanton, Calif., assignors to Callery Chemical Company, Pittsburgh, Pa., a corporation of Pennsylvania
No Drawing. Filed Jan. 31, 1963, Ser. No. 255,199
14 Claims. (Cl. 260—462)

This invention relates to a method of producing dimethoxyborane, $BH(OCH_3)_2$, and more particularly to its production from trimethyl borate, $B(OCH_3)_3$.

Dimethoxyborane is useful as a reducing agent for organic and inorganic compounds and as an intermediate for the preparation of other chemical compounds. It has been used to prepare boronic acids, Schechter, Serial No. 681,457, filed September 3, 1957, now abandoned; and to prepare metal borohydrides, $MBH_4$, Huff, Serial No. 658,895, filed May 13, 1957, now Patent No. 3,079,224, both of common ownership with this application. Dimethoxyborane is particularly useful for the preparation of diborane, $B_2H_6$, as it may be disproportionated according to

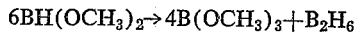
$$6BH(OCH_3)_2 \rightarrow 4B(OCH_3)_3 + B_2H_6$$

Dimethoxyborane has previously been prepared by the reaction of diborane and trimethyl borate, and more recently from the reaction of sodium hydride, NaH, and trimethyl borate by Carpenter, Bush and Schechter, Serial No. 441,636, filed July 6, 1954, now Patent No. 3,014,059, of common ownership with this application. These methods require that one of the reactants contain a B—H bond, or that the hydrogen to form the B—H bond be supplied as hydride ion, H$^-$. Hydrogen in the form of hydride ion is relatively expensive as it is formed by the reaction of a free active metal and hydrogen. Since diborane or other compounds containing a B—H bond are originally formed from hydride ion, the use of such compounds to make dimethoxyborane is more expensive than the use of hydride ion directly. A significant aspect of this invention is that dimethoxyborane is prepared without using hydride ion.

This invention is based on the discovery that trimethyl borate may be decomposed to produce dimethoxyborane by supplying energy to cause molecular excitation. The energy may be supplied as electrical energy by electrical discharges or as thermal energy by normal heating or mechanical heating as by adiabatic compression. When the trimethyl borate is thermally decomposed, the gases in the reactor are preferably maintained at pyrolysis temperatures for a relatively short time since the desired product is itself subject to thermal decomposition. Thus, it is noted that this invention involves the decomposition of what is normally considered a more stable molecule (trimethyl borate) into a compound (dimethoxyborane) which is normally considered much less stable.

The decomposition reaction to produce dimethoxyborane also produces by-products from which the dimethoxyborane can be separated. The major by-products are methane, carbon monoxide, hydrogen, and an easily condensed product of relatively low volatility hereafter referred to as the liquid by-product. This liquid by-product has a boroxine structure and contains a large proportion of hydroxyl groups; it is primarily trimethoxyboroxine, and the hydroxyl groups are believed to be present as hydroxy substituted trimethoxyboroxine or as dissolved boric acid. Other reaction by-products which have been detected, some in only trace amounts, include ethylene, acetylene, ethane, dimethoxymethane, and dimethylether.

The dimethoxyborane may be separated from the by-products by a variety of methods. For example, the gaseous products effluent from the decomposition reaction may be passed through a condenser at −80° C. to seprate the condensable products, i.e. liquid by-product, unreacted trimethyl borate, and dimethoxyborane, from the non-condensable by-products, i.e. hydrogen, carbon monoxide, and methane. The dimethoxyborane may then be distilled from the condensate, preferably under vacuum. The distillation should be performed promptly as the hydroxyl groups present in the condensible by-products react slowly with dimethoxyborane causing a loss of product. It is preferred to separate the product by passing the reactor effluent gases through an ambient temperature condenser, most conveniently an air condenser, to separate the liquid by-product from the other reaction products. Although dimethoxyborane and trimethyl borate are liquids at ambient temperature their vapor pressures are very high in comparison with the liquid by-product and they are carried through the condenser by the non-condensable gases. In this manner the compounds containing hydroxyl groups are separated from the dimethoxyborane. The ambient condenser gaseous effluent contains dimethoxyborane, methyl borate and the non-condensable gases. Dimethoxyborane and trimethyl borate are separated from this mixture by fractional condensation or by scrubbing with a suitable liquid such as trimethyl borate. The trimethyl borate-dimethoxyborane mixture is generally used directly, e.g. in preparation of diborane or borohydrides, although the dimethoxyborane may be separated from the methyl borate by distillation.

One presently preferred method of heating trimethyl borate to effect the thermal decomposition, or pyrolysis reaction, is to continuously pass the reactant through a heated tube since the combination of elevated reaction temperature and short reaction time may be readily achieved. Any material of construction that maintains its mechanical strength at pyrolysis temperature is satisfactory for reactor construction, e.g. stainless steel, nickel, and silica glass. When trimethyl borate is passed through a clean, previously unused reactor, there is an initial induction period of short duration during which only a trace amount of dimethoxyborane is produced. It is believed that the reactor is conditioned during this initial period by the formation of a catalytic material from a decomposition of trimethyl borate which promotes the pyrolysis reaction that yields dimethoxyborane. Other methods of heating will occur to those familiar with the art, e.g. using a hot wire or grid.

As used herein pyrolyze and pyrolysis refer to the irreversible thermal decomposition of the trimethyl borate alone or in the presence of a suitable catalyst. When trimethyl borate (B.P. 68.5° C.) vapor is heated in the absence of liquid trimethyl borate to a temperature substantially higher than the boiling point of liquid trimethyl borate a thermal decompositon is observed. Using pure trimethyl borate vapor, the presence of dimethoxyborane is detected at about 500° C. in the decomposition products with increasing amounts observed as the temperature is raised. Substantial amounts of dimethoxyborane are formed at about 750° C. and above about 1200° C. very little dimethoxyborane is recovered unless extremely short reaction times are used. At the higher temperatures the pyrolysis of dimethoxyborane itself is of increasing significance. The pyrolytic reaction therefore involves a careful control of conditions such as time and temperature to effect a substantial decomposition of trimethyl borate into dimethoxyborane with a minimum loss of the product through thermal decomposition prior to recovery. It is generally preferred to carry out this pyrolytic reaction between about 800° C. and 1000° C. since between these temperatures practical reaction times are involved to produce substantial amounts of dimethoxyborane with the temperature being low enough to prevent excessive loss of the desired product.

To obtain 100% utilization of the boron in the methyl borate reactant, there would be produced 1 mol of dimethoxyborane for each mol of trimethylborate. Although it is not known whether the pyrolysis reaction mechanism is such that a 100% utilization of the boron is theoretically possible, the various yields have been calculated on this basis. The pyrolysis reaction is evaluated in both per pass yield and ultimate yield. Per pass yield is defined as: (Mols of dimethoxyborane recovered)/(mols of trimethyl borate fed)×100, and is a measure of the dimethoxyborane produced related to the reactor throughput. Ultimate yield is defined as: (Mols of dimethoxyborane recovered)/(mols of trimethyl borate consumed)×100, and is a measure of the yield if unreacted trimethyl borate is recycled. An ultimate yield of 50% means that one-half of the boron from the trimethyl borate consumed by pyrolysis reaction is recovered as dimethoxyborane, and one-half is recovered as other pyrolysis products. We have found, however, that essentially all of the boron which is not converted to dimethoxyborane is recovered in the liquid by-product and is in the form of trimethoxyboroxine, boric acid, boric oxide, or similar compounds which are readily and easily reacted with methanol to form trimethyl borate. Thus, even though the ultimate yield of the pyrolysis reaction is 50%, the by-product materials containing boron may be reacted with methanol to form methyl borate which may be reused in the pyrolysis reaction. In this manner 95 to 99% of the boron present in the original trimethyl borate may be converted to dimethoxyborane.

The per pass yield and the ultimate yield of dimethoxyborane from the pyrolysis reaction are affected by the temperature of the pyrolysis reaction and the residence time as is illustrated by the results set forth in Table I. In these reactions a measured stream of hydrogen was bubbled through liquid methyl borate maintained at 15° C., to give a feed mixture containing 8 mols of hydrogen to each mol of trimethyl borate vapor. This feed mixture was then passed through a stainless steel tube 10 centimeters long and 11 mm. inside diameter, heated with a muffle furnace. The temperature was measured by a thermocouple that contacted the outside wall of the tube and was radiation shielded from the furnace elements by asbestos wrappings. The effluent gases from the reactor were passed through a room temperature trap to remove the liquid by-products. The effluent gases were then passed through an infra-red cell and continuously monitored to determine when steady state conditions were reached. When steady state conditions were obtained the effluent gases were passed through a −80° C. condenser to remove unreacted methyl borate and the dimethoxyborane product. The amount of dimethoxyborane produced and unreacted trimethyl borate recovered was determined by conventional chemical analysis of the −80° C. condensate for boron and hydrolyzable hydrogen content as well as by infra-red spectrum analysis. The term $V_r/F$ is approximately proportional to the residence time in the reactor; $V_r$=the volume of reactor in ml. and $F$=the gaseous feed rate in ml. at 18° C. and reaction pressure/sec.

Table I

PYROLYSIS OF METHYL BORATE WITH HYDROGEN DILUENT

[Feed material: 8 mols $H_2$/mol of $B(OCH_3)_3$]

| Temperature | $V_r/F$ | Per Pass Yield (percent) | Ultimate Yield (percent) |
|---|---|---|---|
| 1,000° C. | 0.6 | 12.6 | 25 |
| 950° C. | 1.1 | 9.4 | 37 |
|  | 1.5 | 13.0 | 29 |
|  | 2.5 | 10.4 | 13 |
| 900° C. | 1.5 | 4.5 | 34 |
|  | 2.8 | 9.3 | 29 |
|  | 4.5 | 8.4 | 16 |
|  | 6.3 | 1.0 | app. 1 |
| 860° C. | 3.5 | 2.7 | 28 |
|  | 6.0 | 7.0 | 20 |
|  | 8.3 | 8.0 | 17 |

At a given reaction temperature as the residence time increases the per pass yield increases, goes through a maximum value and then decreases. The maximum per pass yield increases with increasing temperature and occurs at a shorter residence time with increasing temperature. The ultimate yield of dimethoxyborane at any temperature decreases with increasing reaction time, and this effect is of less magnitude the lower the temperature. It is preferred to use a $V_r/F$ ratio of between about 0.5 and 10 which approximates an actual residence time in the reactor, corrected for the expansion of gases at reaction temperature and the gaseous products formed by the reaction, of 0.1 to 2 seconds. Substantial yields of dimethoxyborane have been obtained from reactions in which the residence time was several seconds; and dimethoxyborane has been identified by mass spectrum analysis in products from reactions at 750° C. with a 15 minute reaction period.

Dimethoxyborane is formed when trimethyl borate is pyrolyzed alone as well as when it is admixed with a diluent gas. For example, trimethyl borate vapor preheated to about 110° C. was metered through a tubular stainless steel reactor 3 feet long and 0.186 inch inside diameter. The furnace temperature was measured by six thermocouples evenly spaced along the length of the tube. The temperature profile indicated the effective length of the reactor, i.e. the portion that was maintained at the specified temperature, was approximately 20 inches, and this value was used to determine the effective reactor volume. When trimethyl borate was pyrolyzed at 965° C. with a $V_r/F$ value of 1.3, the per pass yield of dimethoxyborane was 4.7%. The yield of dimethoxyborane using trimethyl borate alone depends on the temperature and reaction time in the same manner as when using mixtures of trimethyl borate and a diluent gas. Higher yields have been obtained when a suitable diluent gas is used. For example, in a reaction at the same conditions as the preceding reaction, i.e., 865° C. and $V_r/F=1.3$, except using a feed mixture containing 5 mols of hydrogen for each mol of methyl borate, the per pass yield of dimethoxyborane was 9%.

Higher per pass yields and ultimate yields are obtained with higher proportions of diluent gas. For example, a pyrolysis reaction using the 0.186 inch diameter reactor as above with a $V_r/F$ of 0.55, a temperature of 860° C. and a feed mixture with a $H_2$ to $B(OCH_3)_3$ ratio of 10 to 1 gave a per pass yield of 6.2% and an ultimate yield of 25.5%; a pyrolysis reaction at the same condition except a 15 to 1 ratio of $H_2$ to $B(OCH_3)_3$ gave a 7.9% per pass yield and a 37.1% ultimate yield. Similar results are obtained with other inert diluent gases such as helium, argon or nitrogen. Even though the yields are increased it is generally not desirable to use extreme excesses of diluent gas since larger volumes of gas must be passed through the reactor for a given amount of dimethoxyborane product. Also, when the product is recovered by condensation methods the presence of large amounts of noncondensable diluent gases reduce the effectiveness of condensers. It is generally preferred to use from about 3 to 10 mols of diluent for each mol of trimethyl borate.

Methane, $CH_4$, and carbon monoxide, $CO$, appear to affect the chemical equilibrium of the pyrolysis reaction, and act differently than other inert diluents. Both the per pass yield and ultimate yield of dimethoxy borane are substantially higher when methane is used rather than another inert diluent. For example, when a feed mixture containing 8 mols of diluent for each mol of trimethyl borate was pyrolyzed at 860° C. and a $V_r/F$ value of 6.0, the yield of dimethoxyborane using $CH_4$ and $H_2$ was as follows:

|  | Per Pass Yield | Ultimate Yield |
|---|---|---|
| Hydrogen diluent | 7 | 20 |
| Methane diluent | 9 | 30 |

When CO is used as a diluent the ultimate yield is substantially increased, however, the per pass yield is decreased. For example, at a temperature of 950° C., a $V_r/F$ value of 1.5 and 8 mols of diluent for each mol of methyl borate, the yields of dimethoxyborane were as follows:

|  | Per Pass Yield | Ultimate Yield |
|---|---|---|
| Hydrogen diluent | 13 | 29 |
| Carbon Monoxide diluent | 9 | 53 |

We have found that the thermal decomposition of trimethyl borate is most convenient and economical, but other methods of causing molecular excitation to decompose trimethyl borate are effective in preparing dimethoxyborane. For example, dimethoxyborane is produced when trimethyl borate is subjected to the action of an electrical discharge. Hydrogen sweep gas was passed through liquid trimethyl borate at room temperature and the resultant gas mixture was passed through a reactor where it was subjected to an electrical discharge. The effluent gaseous products were analyzed to determine the amount of dimethoxyborane produced by infrared spectrum analysis and by chemical analysis of the condensed product in the same manner as described above for the pyrolysis reactions. The power was supplied by a standard 15,00 volt neon tube transformer; the voltage input to the primary windings was controlled by an autotransformer and the discharge electrodes were connected to the secondary windings. A 200 ml. Pyrex bulb, equipped with tungsten point electrodes 5 cm. apart and gas inlet and outlet openings transverse to the electrodes, was used for several reactions. A 0.7% per pass yield of dimethoxyborane was obtained when 12.6 mols of trimethyl borate was swept through the reactor in 12 minutes at a total pressure of 110 mm. of Hg with the primary voltage maintained at 57 volts. A 7.0% per pass yield was obtained using the same apparatus when 12.6 mols of trimethyl borate was swept through the reactor in 34 minutes at atmospheric pressure with a primary voltage of 102 volts. Similar results were obtained with other reactions using point electrodes separated by from 2 to 7 centimeters where annular openings around the electrodes were used as gas inlet and outlet, and in reactions using platinum disc electrodes 30 mm. in diameter.

In other reactions trimethyl borate vapor alone, or mixed with a diluent gas, was charged into a 10 cm. infra-red cell used as a reactor and subjected to a high frequency Tesla coil discharge between copper point electrodes spaced 4.5 cm. apart. When trimethyl borate at a pressure of 55.5 mm. of Hg was subjected to the discharge for one minute, the resulting product mixture in the reactor contained 5.7 mol percent dimethoxyborane. At the same pressure, after 15 second discharge, there was 3.8 mol percent dimethoxyborane present. The products contained 2.8 mol percent dimethoxyborane when a mixture of trimethyl borate, 51.3 mm. Hg partial pressure, and hydrogen, 64 mm. Hg partial pressure, was subjected to the discharge for a period of one minute. Dimethoxyborane was also produced when trimethyl borate was subjected to a silent electrical discharge as is commonly used in ozonizers.

This application is a continuation-in-part of Edwards et al., Serial No. 718,087, filed February 27, 1958, now abandoned.

According to the provisions of the patent statutes, we have explained the principle and mode of practicing our invention, have described what we now consider to be its best embodiments. However, we desire to have it understood that within the scope of the appended claims, the invention may be practiced otherwise than as specifically described.

We claim:
1. A method of preparing dimethoxyborane which comprises decomposing trimethyl borate at a temperature between about 750° C. and 1200° C. and recovering the dimethoxyborane formed.
2. A method according to claim 1 in which the trimethyl borate is mixed with an inert diluent gas.
3. A method according to claim 2 in which the diluent gas is $H_2$.
4. A method according to claim 2 in which the diluent gas is $CH_4$.
5. A method according to claim 2 in which the diluent gas is CO.
6. A method of preparing dimethoxyborane which comprises the steps of passing a mixture of trimethyl borate and an inert diluent gas through a heated reactor maintained at a temperature between about 800° C. and 1000° C., and maintaining a feed rate of said mixture such that the ratio of the reactor volume to the volume feed rate per second measured at 18° C. and reaction pressure is between about 0.5 and 10 and recovering the dimethoxyborane formed.
7. A method according to claim 6 in which the molar ratio of inert diluent gas to trimethyl borate is between about 3/1 and 10/1.
8. A method of preparing dimethoxyborane which comprises passing trimethyl borate through a reactor maintained at a temperature between about 800 to 1000° C., and maintaining a feed rate of trimethyl borate such that the ratio of the reactor volume to the volume feed rate per second measured at 18° C. and reactor pressure is between about 0.5 and 10, passing the gaseous reaction products through an ambient temperature partial condenser, and recovering dimethoxyborane from the gaseous effluent from said partial condenser.
9. A method of preparing dimethoxyborane which comprises passing a mixture of trimethyl borate and an inert diluent gas through a reactor maintained at a temperature between about 800° C. and 1000° C. and maintaining a feed rate of said mixture such that the ratio of the reactor volume to the volume feed rate per second measured at 18° C. and reactor pressure is between about 0.5 and 10, passing the gaseous reaction products through an ambient temperature partial condenser, and recovering dimethoxyborane from the gaseous effluent from said partial condenser.
10. A method according to claim 9 in which the molar ratio of inert diluent gas to trimethyl borate is between about 3/1 and 10/1.
11. A method of preparing dimethoxyborane which comprises the steps of passing trimethyl borate through a heated reactor maintained at a temperature between about 800° C. and 1000° C., and maintaining a feed rate of trimethyl borate such that the ratio of the reactor volume to the volume feed rate per second measured at 18° C. and reaction pressure is between about 0.5 and 10, and recovering the dimethoxyborane formed.

12. A method of preparing dimethoxyborane which comprises decomposing trimethyl borate vapor in an electric discharge and recovering the dimethoxyborane formed.

13. A method according to claim 12 in which the trimethyl borate is admixed with an inert diluent gas.

14. A method of preparing dimethoxyborane which comprises subjecting methyl borate to an electrical discharge, passing the reaction products through an ambient temperature partial condenser and recovering dimethoxyborane from the gaseous effluent from said partial condenser.

References Cited by the Examiner

Webster et al.: "Journal of American Chemical Society," vol. 553, pp. 3233–5 (1933).

CHARLES B. PARKER, *Primary Examiner.*